(12) United States Patent
Skinner et al.

(10) Patent No.: US 8,340,937 B2
(45) Date of Patent: Dec. 25, 2012

(54) CHARACTERIZATION OF A MODEL-BASED SPECTRAL REFLECTANCE SENSING DEVICE

(75) Inventors: Gary Walker Skinner, Rochester, NY (US); Scott Seyfried, Rochester, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 387 days.

(21) Appl. No.: 12/777,344

(22) Filed: May 11, 2010

(65) Prior Publication Data

US 2011/0282613 A1 Nov. 17, 2011

(51) Int. Cl.
*G01D 18/00* (2006.01)
(52) U.S. Cl. ........................................... 702/104
(58) Field of Classification Search .................. 702/104
See application file for complete search history.

(56) References Cited

U.S. PATENT DOCUMENTS

| | | | |
|---|---|---|---|
| 6,449,045 B1 | 9/2002 | Mestha | |
| 6,556,300 B2 | 4/2003 | Tandon et al. | |
| 6,556,932 B1 | 4/2003 | Mestha et al. | |
| 6,584,435 B2 | 6/2003 | Mestha et al. | |
| 6,587,793 B2 | 7/2003 | Viassolo et al. | |
| 6,603,551 B2 | 8/2003 | Mestha et al. | |
| 6,721,692 B2 | 4/2004 | Mestha et al. | |
| 7,383,261 B2 | 6/2008 | Mestha et al. | |
| 7,555,396 B2 | 6/2009 | Mestha | |
| 2002/0165684 A1* | 11/2002 | Olson | 702/85 |
| 2003/0055611 A1* | 3/2003 | Mestha et al. | 702/196 |

OTHER PUBLICATIONS

Yonghui Zhao and Roy S. Berns. Image-Based Spectral Reflectance Reconstruction Using the Matrix R Method. COLOR Research and Application, vol. 32, No. 5, pp. 343-351. Wiley Periodicals, Inc. Oct. 2007.

* cited by examiner

*Primary Examiner* — Michael Nghiem
(74) *Attorney, Agent, or Firm* — Philip E. Blair; Fleit Gibbons Gutman Bongini & Bianco P.L.

(57) ABSTRACT

What is disclosed is a novel system and method for characterizing a model-based spectral reflectance sensing device. In accordance with the teachings hereof, measurements of training samples taken with a previously manufactured 'fleet master' sensing device are adapted, in a manner more fully disclosed herein, based upon knowledge of the wavelengths of the illuminators used for both the subject and fleet master sensors, as well as spectral reflectance response of the training samples as measured by a reference spectrophotometer device. Utilizing the adapted measurements of the fleet master device, a reconstruction matrix can be quickly constructed for the subject sensor. The present system and method provides reasonably good accuracy using pre-existing measurement data. This results in manufacturing cost savings on a per-sensor basis.

17 Claims, 9 Drawing Sheets

CHARACTERIZATION OF A MODEL-BASED SPECTRAL REFLECTANCE SENSING DEVICE

TECHNICAL FIELD

The present invention is directed to systems and methods for characterizing a model-based spectrophotometric device for improving sensor-to-sensor accuracy in multi-illuminator spectral reflectance sensing devices.

BACKGROUND

Relatively frequent color calibration of a color print device is highly desirable since the colors actually printed on the output media (as compared to the colors intended to be printed) can significantly change, or drift, out of calibration over time. For example, changes in the selected or loaded print media, such as differences paper or plastic sheet types, materials, weights, calendaring, coating, humidity, etc., or changes in the printer's ambient conditions, changes in the image developer materials, aging or wear of printer components, varying interactions of different colors, etc., can all affect output color reproduction quality. One method for assuring color quality is to accurately measure the colors being reproduced by the color print device and calibrate the device accordingly. Spectroscopy is used in this regard.

Spectroscopy is the measurement and analysis of electromagnetic radiation absorbed, scattered, or emitted by atoms, molecules, or other chemical or physical materials. When light waves strike a surface, some of the spectrum's energy is absorbed by the surface while other parts of the spectrum are reflected. The light that is reflected has its own composition of various wavelengths. Different surfaces containing pigments, dyes, inks, and the like, which generate different but unique wavelength compositions. Light can be modified by striking a reflective surface such as paper, or by passing through a transmissive object such as film. The pattern of wavelengths that reflects from the object's surface is the object's spectral data.

Multi-illuminator spectrophotometric reflectance sensing systems, especially those suitable for high speed inline document color analysis, must be calibrated and characterized in accordance with particular operating characteristics of known illumination sources and reflectance sensors. Accurate device calibration depends on the accuracies of the illuminators and sensors. Sensor-to-sensor variations are largely due to differences in light emission curves, peak wavelengths, and full width half max values in the emission spectra. Moreover, when a sensor is installed on a print device, it may require personalization to improve accuracy due to variations in mounting, ambient and mechanical tolerances. Such differences can give rise to large variations in measurement accuracy. Correcting for often subtle variations between sensors requires that a characterization be performed on a per-sensor basis. This is usually performed during manufacturing. Such a characterization can be time consuming and labor intensive, which can contribute to the overall cost of manufacturing the sensing instrument. Moreover, sensor-to-sensor variations dictate that the database of training sample measurements taken using a first sensor cannot be used to calibrate a second sensor because slight differences in peak wavelengths across illuminators can produce a dramatic difference in the measurements taken by the two sensing devices; particularly if the spectral reflectance curve of the training sample has a steep slope in that area of the visible light range. As such, a reconstruction matrix cannot be generated for the second sensor using the first sensor's training sample measurements. This is how sensors have traditionally been characterizing. What has not been achieved is generating reconstruction matrices for subsequent sensors using training sample measurements from a single sensor.

Accordingly, what is needed in this art are systems and methods for quickly characterizing a model-based spectral reflectance sensing device without measuring the full set of characterization color patch training samples currently used in manufacturing and characterizing individual reflectance sensing devices.

INCORPORATED REFERENCES

The following U.S. patents, U.S. patent applications, and Publications are incorporated herein in their entirety by reference.

"Method And System To Personalize Sensor Characterizing Reference Database In Multiple LED Spectrophotometers", U.S. Pat. No. 7,555,396, to Mestha.

"Reference Database And Method For Determining Spectra Using Measurements From An LED Color Sensor, And Method Of Generating A Reference Database", U.S. Pat. No. 7,383,261, to Mestha et al.

"System And Method For Reconstruction Of Spectral Curves Using Measurements From A Color Sensor And A Spectral Measurement System Model", U.S. Pat. No. 6,556,932, to Mestha et al.

"Systems And Methods For Determining Spectra Using Dynamic Karhunen-Loeve Algorithms With Measurements From Led Color Sensor", U.S. Pat. No. 6,584,435, to Mestha et al.

"Systems And Methods For Determining Spectra Using Fuzzy Inference Algorithms With Measurements From LED Color Sensor", U.S. Pat. No. 6,587,793, to Viassolo et al.

"System And Method From Reconstruction Of Spectral Curves Using Measurements For A Color Sensor And Statistical Techniques", U.S. Pat. No. 6,449,045, to Mestha.

"Systems And Methods For Determining Spectra Using Dynamic Least Squares Algorithms With Measurements From LED Color Sensor", U.S. Pat. No. 6,721,692, to Mestha et al.

"Color Measurement Of Angularly Color Variant Textiles", U.S. Pat. No. 6,603,551, to Mestha et al.

"Color Imager Bar Based Spectrophotometer Photodetector Optical Orientation", U.S. Pat. No. 6,556,300, to Tandon et al.

"*Image-Based Spectral Reflectance Reconstruction Using The Matrix R Method*", Yonghui Zhao, Roy S. Berns, Vol. 32, No. 5, pp 343-351 (October 2007).

BRIEF SUMMARY

What is disclosed is a novel system and method for quickly characterizing a model-based spectral reflectance sensing device without measuring the full set of characterization color patch training samples currently used in manufacturing and characterizing individual sensors. In accordance with the teachings hereof, measurements of color training samples taken with a previously manufactured 'master' sensing device are adapted, in a manner more fully disclosed herein, based upon knowledge of the wavelengths of the illuminators used for both the subject and fleet master sensors, as well as spectral reflectance response of the color training samples as measured by a reference spectrophotometer device. A reference database can be personalized for individual sensors in a multi-illuminator spectrophotometric system in a manner that avoids having to acquire thousands of color training sample measurements per-sensor to achieve an acceptably accurate characterization of a model-based sensing system. A reconstruction matrix can be quickly constructed for the subject sensor. The present system and method provides reasonably good accuracy using pre-existing measurement data. This results in manufacturing cost savings on a per-sensor basis.

In one example embodiment, the present method for characterizing a model-based spectral reflectance sensing device using a fleet master spectral reflectance sensing device involves the following. A respective wavelength value is measured for each illuminator of a master reflectance sensing device and for each illuminator of a subject reflectance sensing device. For each of a desired number of color training samples the following steps are iteratively performed. A reference spectral reflectance curve, measured by a reference reflectance sensing device, is received for the current color training sample. A reflectance value, measured by a master reflectance sensing device, is received for each illuminator of the master reflectance sensing for the current sample. For each illuminator of the subject device, the reference curve received for this sample is used to obtain a first reflectance value corresponding to the wavelength measured for the current illuminator of the subject reflectance sensing device and to obtain a second reflectance value corresponding to the wavelength measured for the corresponding illuminator of the master reflectance sensing device. A difference is calculated between the first and second reflectance values and the difference is associated with the current illuminator of the subject reflectance sensing device. An estimated reflectance value is determined for the current illuminator of the subject reflectance sensing device by adding the aforementioned difference to the master reflectance sensing device's measured reflectance value for the current illuminator. The process repeats for each illuminator of the subject device and for each of the desired number of color training samples. The estimated reflectance values are then used to generate a spectral reconstruction matrix for the subject reflectance sensing device. The subject device is then characterized using the reconstruction matrix by installing the matrix on the subject device. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is novel system and method for quickly characterizing a reflectance sensing device without measuring the full set of characterization color patch training samples currently used in manufacturing and characterizing individual sensors. In accordance with the teachings hereof, measurements of training samples taken with a 'fleet master' reflectance sensing device are adapted based upon knowledge of the wavelengths of the illuminators used for both the subject and master sensors as well as the spectral reflectance response of the training samples as measured by the reference device. A reconstruction matrix can then be constructed for the subject sensor utilizing estimated reflectance values.

It should be understood that one of ordinary skill in this art would be readily familiar with many techniques and algorithms commonly found in the color science and document reproduction arts, particularly with respect to reflectance measurement, spectrophotometric device characterization, and the like. Those of ordinary skill would be familiar with the text: "Control of Color Imaging Systems: Analysis and Design", CRC Press (2009), ISBN-13: 97808-4933-7468, which is incorporated herein in their entirety by reference.

Non-Limiting Definitions

A "reflectance sensing device", as used herein, refers to a spectrophotometric device having a plurality of illuminators for illuminating a sample of interest and sensors for measuring the light reflected from the sample. As used herein, the term 'spectrophotometric device' refers to a 'spectrophotometer', a 'colorimeter', or a 'densitometer', as defined herein further.

A "model-based spectral reflectance sensing device" is a sensing device that is able to deduce spectral reflectance information for areas of the spectrum that have not been measured directly by utilizing a mathematical model or fitting parameters. This is in contrast to a "first-principles" spectral reflectance sensing device, which reports spectral reflectance information measured directly at each wavelength of interest.

A "reflectance value" refers to a value measured using a reflectance sensing device. Each reflectance value corresponds to a wavelength or channel of the device. For example, a Gretag spectrophotometer outputs 36 reflectance values (1 per channel) evenly spaced at 10 nm intervals over a spectrum of 380 nm to 730 nm. An X-Rite Spectrophotometer outputs 31 reflectance values evenly spaced at 10 nm intervals over a spectrum of 400 nm to 700 nm. LED and Grating-based sensors are capable of detecting reflected light and providing distinct electrical signals corresponding to the different levels of reflected light received. Spectral measurements of a test target may be converted using known extrapolation algorithms to provide the reflectance values.

An "illuminator" is a light source having a respective spectrum range. Example illuminators are Infrared (IR) LED, visible LED, and incandescent lamp. A reflectance sensing device may have a plurality of illuminators. A multi-illuminator (multi-channel) device illuminates a target sample with either a plurality of narrow-band or monochromatic light sources, or illuminates the target sample with a plurality of wide-band illumination sources such as flashed Xenon lamp or an incandescent lamp. A given spectrophotometric device may comprise illuminators of different colors or a single illuminator (white) with different color filters. The illuminators of a given device are switched on/off in a predetermined sequence such that spectral measurements can be obtained in each illuminator's wavelength range. Eight commonly target-aimed and sequentially operated illuminators each having a different color spectrum are shown and discussed with respect to the example spectrophotometer of FIGS. 8 and 9.

A "spectrophotometer" is a reflectance sensing device which measures the reflectance over many wavelengths and provides distinct electrical signals corresponding to the different levels of reflected light received from the respective different illumination wavelength ranges using multiple channels.

A "colorimeter" is a reflectance sensing device which typically has three illumination channels and which provides output color values in the trichromatic quantity known as RGB, (red, green, blue) as read by a sensor receiving reflected light from a surface.

A "densitometer" is another reflectance sensing device which typically only has a single channel, and simply measures the amplitude of light reflectivity from the test surface, such as a developed toner test patch on a photoreceptor, at a selected angle over a range of wavelengths, which may be wide or narrow. The output of the densitometer is the optical density of the test sample.

A "reconstruction matrix" is a mathematical model generated using reflectance values measured for a set of reference colors with a known reference reflectance sensing device then measuring the same set of reference colors with a subject instrument. These measurements are stored in a reference database. The subject device uses the reconstruction matrix and a spectral reconstruction algorithm to generate a spectral response curve.

General Discussion

Real-world printers inherently have non-ideal printing materials, colors and behaviors, and therefore have complex non-linear colorimetric responses. Also, interactions between the cyan, magenta, and yellow imaging materials exist, especially on the printed output, which result in unwanted or unintended absorptions and/or reflections of colors. Even after a printer is initially calibrated, such that one or a range of input digital CMYK values produce proper colors, the full spectrum of CMYK values and printed colors will not be or remain fully accurate. In other words, the colors requested or directed to be printed by various input signals will not be the same as the actual colors printed. This discrepancy arises in part because the relationship between the digital input values that drive the printer and the resulting colorimetric response is a complex non-linear function. Labeling the response, or other values, as "colorimetric" can indicate that the response or value has been measured by such an instrument. Adequately modeling the colorimetric response of a printer to achieve linearity across the entire available spectrum requires many parameters.

Typically, a color correction look-up table is built which approximates the mapping between RGB colorimetric space and CMYK values, as taught in the above-cited references. Each RGB coordinate may be typically represented by an 8-bit red value, an 8-bit green value, and an 8-it blue value. Although those RGB coordinates are capable of addressing a look-up table having $256^3$ locations, measuring and storing $256^3$ values is time consuming and expensive. The look-up table is thus typically partitioned into a smaller size such as 16×16×16 (4096) table locations, each of which stores a four-dimensional CMYK value. Other CMYK values may then be found by interpolating the known CMYK values using an interpolation process, for example, trilinear or tetrahedral interpolation. The color correction look-up table may be built by sending a set of CMYK digital values to the printer, measuring the colorimetric RGB values of the resulting color patches outputted by the printer with a spectrophotometer, and generating the look-up table from the difference between the inputted values and the measured outputted values. The color correction look-up table corrects for non-linearities, printing parameter variations, and unwanted absorptions of inks, so that the printer will print the true corresponding color.

After the color correction table is generated, the actual printer response may tend to drift over time. To correct for the drift, the system is adjusted or recalibrated periodically. Recalibrating the color correction table involves periodically printing and re-measuring a set of test patches which are then compared to an original set of color patches by calibration software. Re-measuring, however, has heretofore more typically been performed manually by a scanner or other measuring device which is remote from the printer being recalibrated. For example, by removing a test output sheet from the printer output tray, placing it (stationary) on a table and sliding a spectrophotometer over it, manually or with an X-Y plotter driver, or automatically feeding the test sheet through the spectrophotometer, and storing the spectrophotometer output signals data in an associated memory to read out later, or connecting the spectrophotometer by an electrical wire or cable to the printer controller or its server to directly receive those color recalibration electrical input signals from the spectrophotometer and process them. However, this manual testing of calibration sheets assumes that the operator can properly manually identify and measure the test color sheets or patches being tested in the correct order, from the correct machine. Once a color correction table is generated, it must be associated with the correct printer otherwise, a different printer will be recalibrated with an incorrect correction table. An automatic, inline, dedicated spectrophotometer color correction system does not have these problems or potential error sources.

The present system and method is directed to characterizing a subject spectrophotometer device using a fleet master spectrophotometer for use in multi-function document reproduction systems and devices with automatic inline color calibration systems which utilize an inline color measurement system. Such systems have a reflectance sensing device mounted in the paper path of moving sheets within the document reproduction device, preferably in the output path after fusing or drying so as to not interfere with or interrupt normal printing or the movement of the printed sheets in the paper path. It should be appreciated that the methods hereof are not to be considered as being limited to document reproduction systems. The disclosed methods are used to characterize model-based spectral reflectance sensing devices used in a variety of diverse applications where color measurements and/or the use of color measurements for various quality or color consistency control functions are considered important. Example different technologies and manufacturing applications are, for instance, textiles, wallpaper, plastics, paint, inks, fabrics, dyes, etc. Such reflectance sensing devices may be part of a direct feedback color control system, an automated color correction systems, an off-line color sampling system for regular or random quality control testing where accuracy of the reflectance sensing equipment is required. The disclosed embodiments can be used in numerous different color calibration or correction systems and can be readily incorporated into color calibration device controllers incorporated in various inline color control or color processing systems.

Various color correction systems can employ the output signals of spectrophotometers, using various sophisticated feedback, correction and calibration systems, which need not be discussed in any further detail here, since the general concepts and many specific embodiments are disclosed in many other patents (including those cited herein) and publications. In particular, to electronically analyze and utilize the spectrophotometer or other electronic printed color output information with a feedback analysis system for the color control systems for a printer or other color reproduction system.

Color control systems should not be confused with color registration systems which are dedicated systems for insuring that colors are precisely adjacent to one another. Color registration systems provide positional information to one or more device controllers which shift the position of respective color images being printed such that the colors are accurately superimposed.

Example Spectrophotometer

Figure 8:
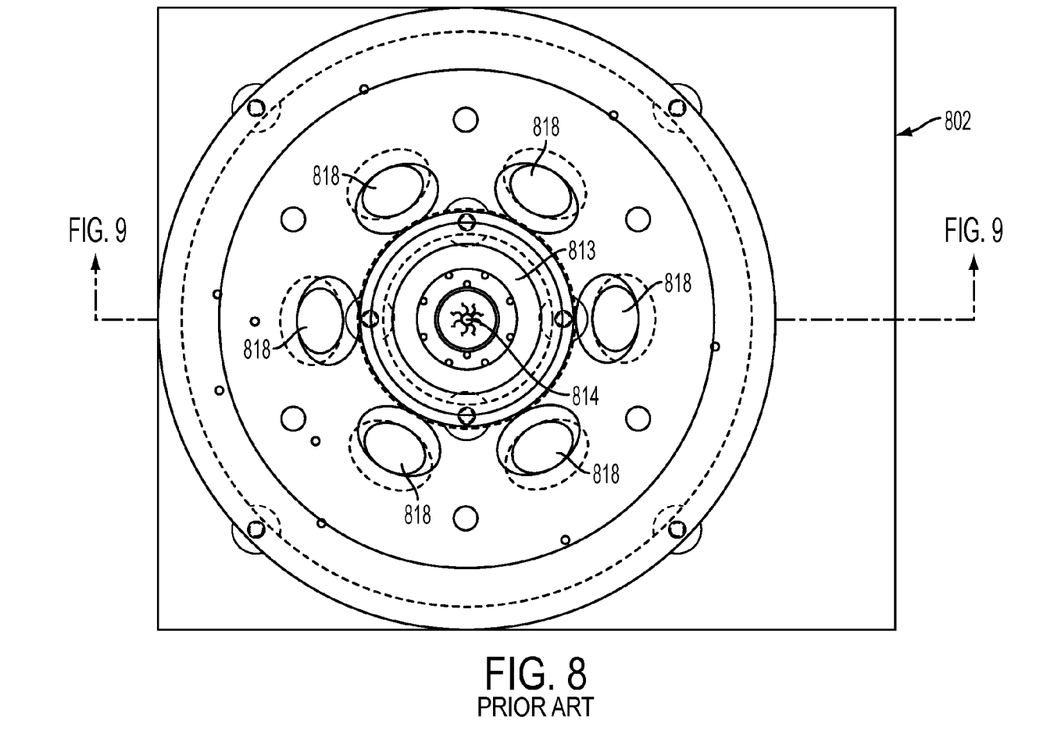
FIG. 8 is a top view of one example reflectance sensing device which measures reflectance values of color training samples or "test patches"
Figure 9:
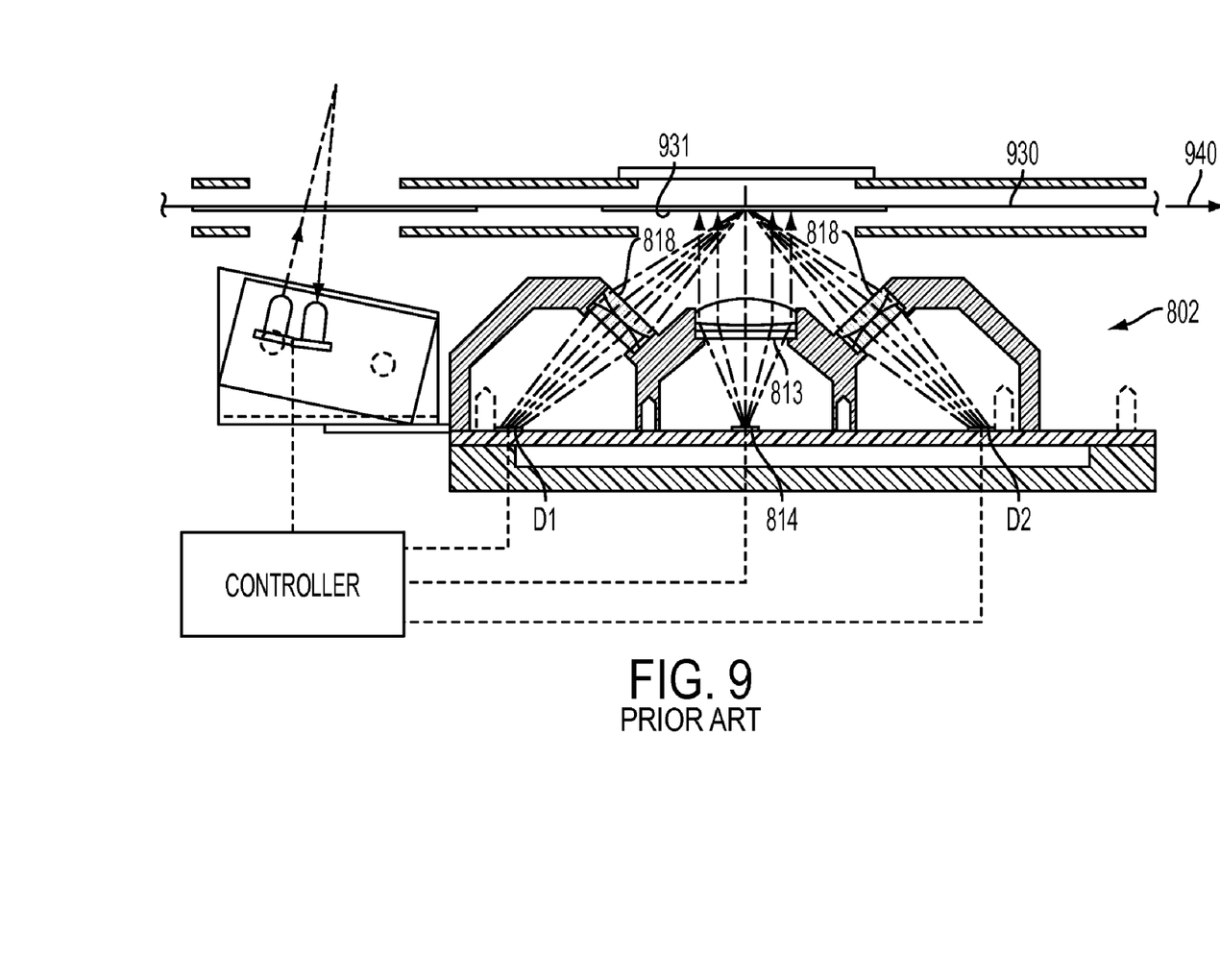
FIG. 9 is a cross-sectional view taken along the line 2-2 of FIG. 8 shown measuring a test patch of a sheet moving in an output path with multiple detector chips parallel to the image plane.

Reference is now being made to FIGS. 8 and 9, which collectively illustrate one example spectral reflectance sensing device which measures reflectance values of color samples or test patches. The terms photosensors, photo-site, cells, detectors, and sensors are used interchangeably, with each capable of generating an output electrical signal in response to receiving a reflected light.

Spectrophotometer 802, is one example spectrophotometric device having 8 illuminators (D1, D2, . . . D8 (814)) each having a different color spectrum. In this embodiment, there are eight LEDs tightly clustered in the center of the device which shine straight up. There are six photodetectors mounted in a wide circle around the perimeter of the device which detect light reflecting from the color test patch 931 at a 45 degree angle. Two of these six photodetector locations are labeled D1 and D2 in FIG. 9. Color filters for the illuminators may be provided in some cases if desired to further control the spectral range. It is well known to use optical filters of different colors for different illumination sources. Such color filters are often used to exclude secondary emissions, and/or to further narrow the output spectra of an illumination source. The different color emission light sources are positioned in one central unit, board, or chip. The plurality of different color emission illuminators sequentially project their illuminations substantially in parallel, perpendicular to the surface of the test target rather than at an angle so as to provide a substantially circular illuminated area rather than one that is elliptical. A substantially circular illumination pattern is formed from respective light rays hitting the surface at a substantially normal angle of incidence. This produces a substantially circular pattern of irradiance on the target. The normal target area is an area of a color test patch 931 printed on sheet 930 and traveling in process direction 940.

Each illuminator may have a lens 813 for focusing the light from each respective light source onto the reflectance sensing device (or sensor array). Although conventional glass or plastic lenses are illustrated, it will be appreciated that fiber optics could be utilized in the alternative to collect the light and to space the reflectance sensing device away from the light source. Illumination of the test target provides a variable level of light reflected from the target surface. The sensors are oriented at 45° to the test target to receive the reflected light. The reflected illumination level is not detected by a single photocell but is detected by multiple spectral response photosites. The voltage signal is integrated. The integrated voltage is a function of the reflectance. The voltages are then normalized using, for example, a white tile calibration, which is standard practice in the color measurement industry. The normalized voltages are converted to reflectance values to generate a fully populated reflectance spectra which conforms to industry standards.

The relative reflectance of each actuated illuminator's wavelength may be measured by using conventional circuitry and/or software capable of amplifying and integrating the respective outputs of the photosensors, which has integral sample-and-hold circuitry capable of sampling multiple reasonably-sized color test patches on a normal size copy sheet moving rapidly past the sensor array. By briefly pulsing a common driver current source to provide brief drive currents at a level that is above what is sustainable in a continuous current mode, even higher flux detection signals can be obtained and the signals integrated in a shorter time period. By thresholding and/or integrating the output signals, enhanced signal-to-noise ratios can also be achieved. An additional conventional light emitter and detector may be integrated or separately mounted to detect fiducial or timing marks on the test sheet thereby providing an 'enable' signal for illumination and detection.

Example Flow Diagram

Figure 1:
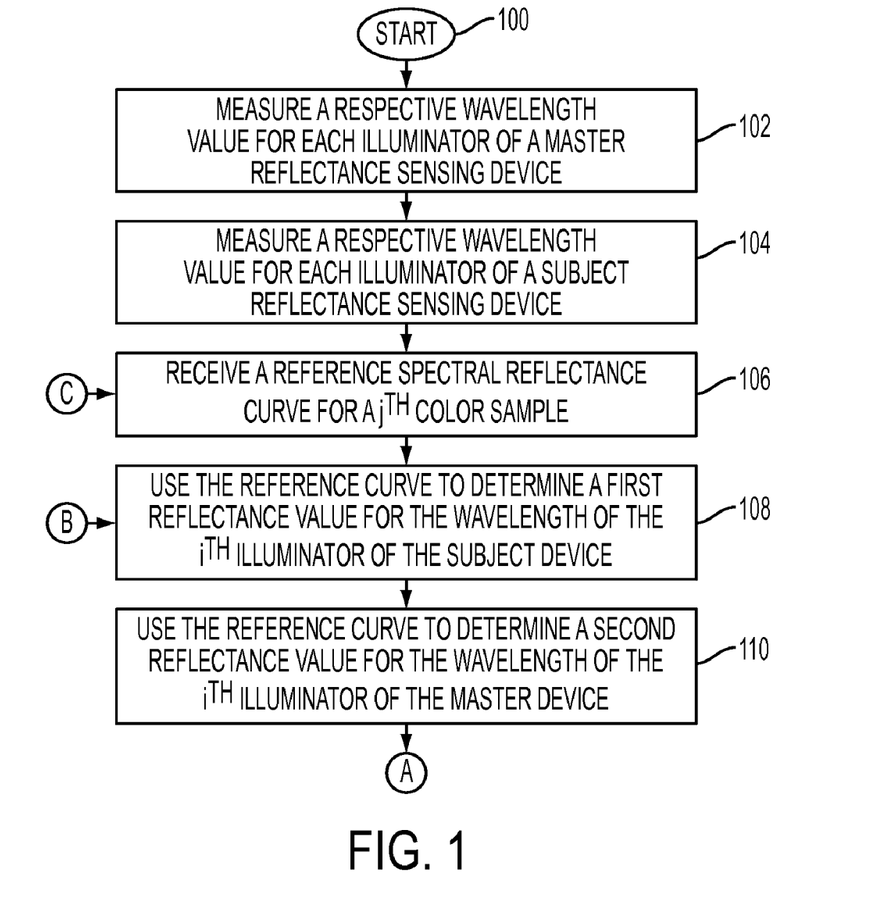
FIG. 1 illustrates a flow diagram of one example embodiment of the present method for characterizing a subject model-based spectral reflectance sensing device.

Reference is now being made to the flow diagram of FIG. 1 which illustrates one example embodiment of the present method for characterizing a subject model-based spectral reflectance sensing device. It should be appreciated that the fleet master reflectance sensing device and the subject reflectance sensing device intended to be characterized using the teachings hereof are of a substantial configuration having a same number of illuminators, for example, 8. The illuminators of the master and subject reflectance sensing devices may comprise narrow-band illumination sources or at least one light source and a plurality of filters. Flow processing begins at step 100 and immediately proceeds to step 102.

Figure 4:
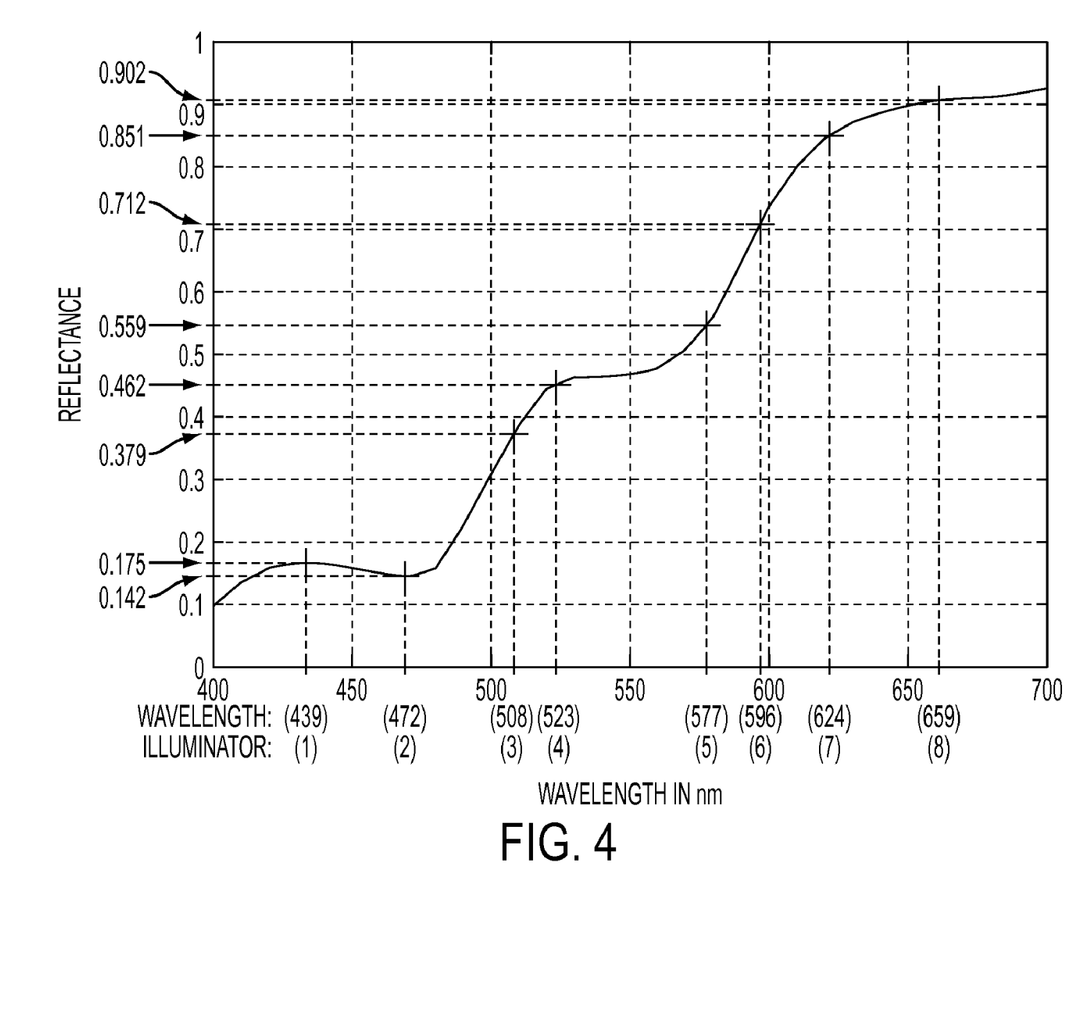
FIG. 4 shows the respective wavelengths measured for each of the 8-channels of the master reflectance sensing device overlaid on the reference curve of FIG. 3.

At step 102, a respective wavelength value is measured for each illuminator of a master reflectance sensing device. Measurements may be stored in a reference database or to a storage device for subsequent retrieval. In one example, the wavelengths measured for each of the 8-illuminators of the master device are as follows: (1) 439, (2) 472, (3) 508, (4) 523, (5) 577, (6) 596, (7) 624, and (8) 659. Wavelengths are shown in nanometers (nm). These values are shown in FIG. 4.

At step 104, a respective wavelength value is measured for each illuminator of a subject reflectance sensing device. The master and subject devices are preferably substantially the same and have a same number of illuminators. The illuminators of the master and subject reflectance sensing devices comprise any of: a narrow band illumination source, and a light source and at least one filter.

Figure 5:
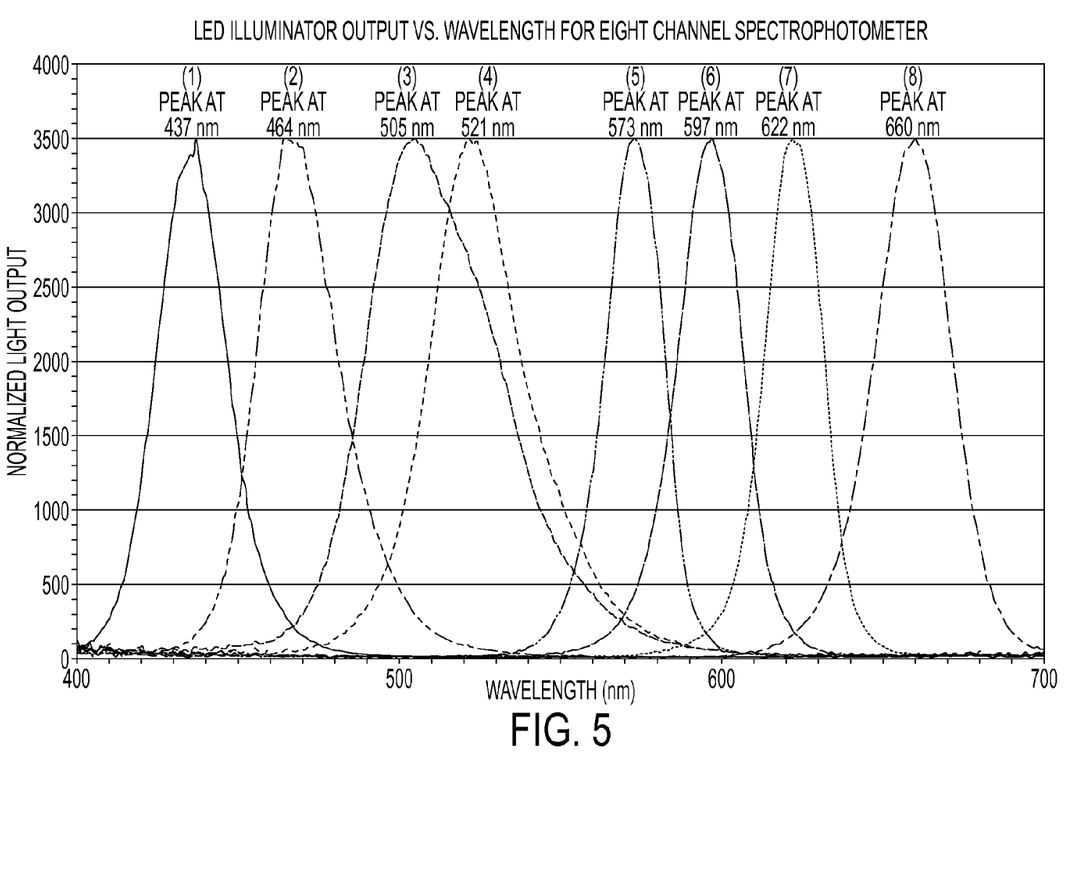
FIG. 5 shows a plot of the wavelength measurements for the 8-channels of the subject reflectance sensing device.

FIG. 5 shows the wavelength values measured for each of the 8-channels of the subject reflectance sensing device. In one example, the peak wavelengths determined for each of the 8-illuminators of the subject device are as follows: (1) 437, (2) 464, (3) 505, (4) 521, (5) 573, (6) 597, (7) 622, and (8) 660. Wavelengths are in nanometers (nm). It should be appreciated that a similar 8-channel plot (as in FIG. 5) would also be available for the master reflectance sensing device. The wavelength values for each illuminator channel are given in peak wavelengths but, in the alternative, the wavelengths may comprise a median or mean value of a distribution of the measured wavelength for a given channel. Alternatively, a full width half max technique (FWHM) is employed. The full width at half maximum is a measure of the width of a distribution, and is obtained from empirical distributions or histograms. For a distribution described by the probability density function given by f(x), the FWHM is defined by $|x_2-x_1|$ where $x_1$, $x_2$ are points to the left and right of the mode $x_m$ of the distribution (defined by $f(x_m)$=max), with $f(x_1)$=$f(x_2)$=f$(x_m)$/2. One of ordinary skill will appreciate that the mode $x_m$ of a distribution is defined as that value of x for which the probability of observing the random variables is a maximum. For the normal distribution, the full width half maximum is defined by:

$$FWHM = 2\sqrt{2\log(1/2)}\sigma = 2.3548\sigma \quad (1)$$

where σ is the standard deviation. The FWHM is only defined for unimodal distributions.

Once wavelength values have been measured for each illuminator of the master reflectance sensing device and for each illuminator of the subject reflectance sensing device, processing proceeds next as follows.

Figure 3:
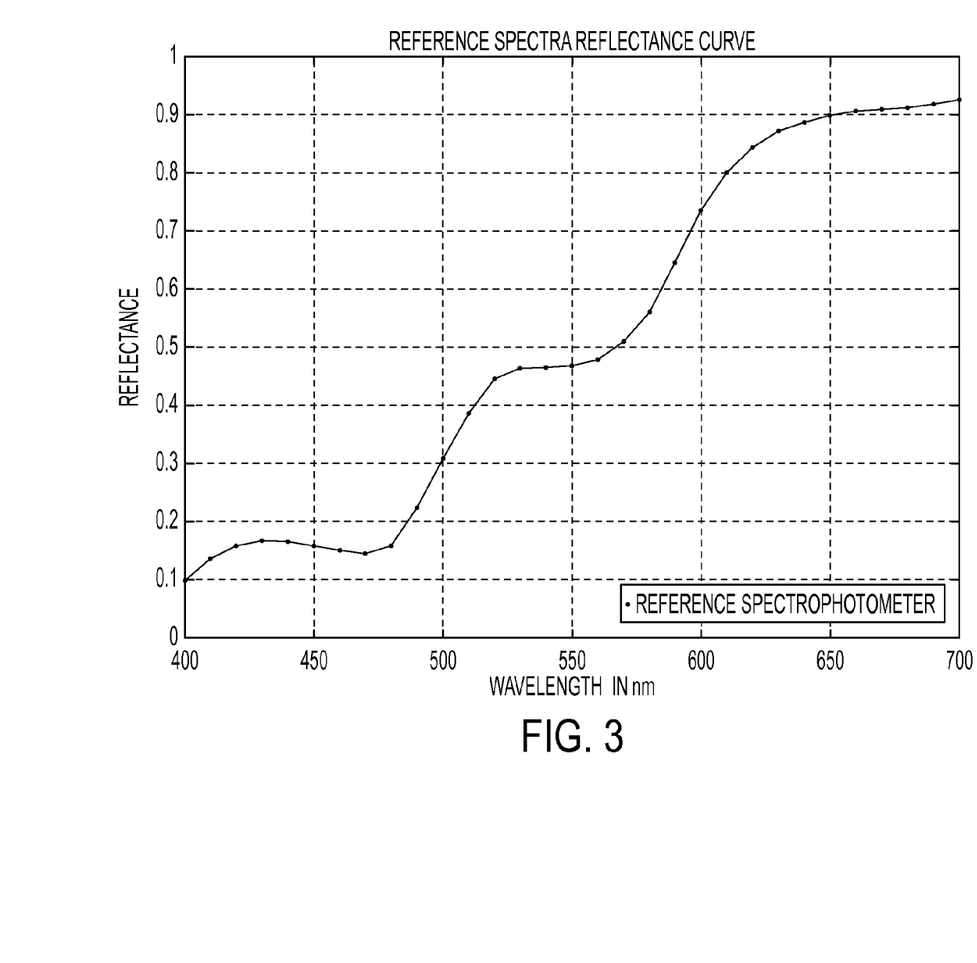
FIG. 3 illustrates an example reference spectral reflectance curve used in accordance herewith as discussed with respect to the flow diagrams of FIGS. 1 and 2.

At step 106, a reference spectral reflectance curve for the $j^{th}$ color training sample is received where j=1 to the desired number of color training samples to be used. The reference curve comprises a plurality of spectral reflectance values each having an associated wavelength. The reflectance curve of FIG. 3 is piecewise linear between values obtained for each of the 31-channels of a reference device. The reflectance curve can be retrieved from a memory or storage device or received from a remote device over a network. Reflectance values and their respective associated wavelength values can be entered or otherwise provided by a user using, for instance, a graphical user interface of a computer workstation.

At step 108, using the reference spectral reflectance curve, determine a first reflectance value corresponding to the wavelength value for the $i^{th}$ illuminator of the subject reflectance sensing device where i=1 to the number of illuminators (8 in this example). On a first iteration (i=1), the wavelength measured for the first illuminator of the subject device is 437 nm. Using the reference curve of FIG. 3, a wavelength of $\lambda_1$=437 nm corresponds to a reference reflectance value of ≈0.172. Thus, the first reflectance value for the 1st illuminator of the subject device is: $R1_1(\lambda_1)$=$R1_1(437)$=≈0.172. It should be appreciated that determining the reflectance values using the reference spectral reflectance curve may involve interpolation and that the approximate values used herein by way of example for discussion purposes are illustrative.

At step 110, using the reference spectral reflectance curve, determine a second reflectance value corresponding to the wavelength value for the $i^{th}$ illuminator of the master reflectance sensing device. In this example where i=1, the wavelength measured for the 1st illuminator of the master device is 439 nm. Using the reference curve of FIG. 3, a wavelength of $\lambda_2$=439 nm corresponds to a reflectance value of ≈0.175. Thus, the second reflectance value for the 1st illuminator of the master reflectance sensing device is: $R2_1(\lambda_2)$=$R2_1(439)$=≈0.175.

Figure 2:
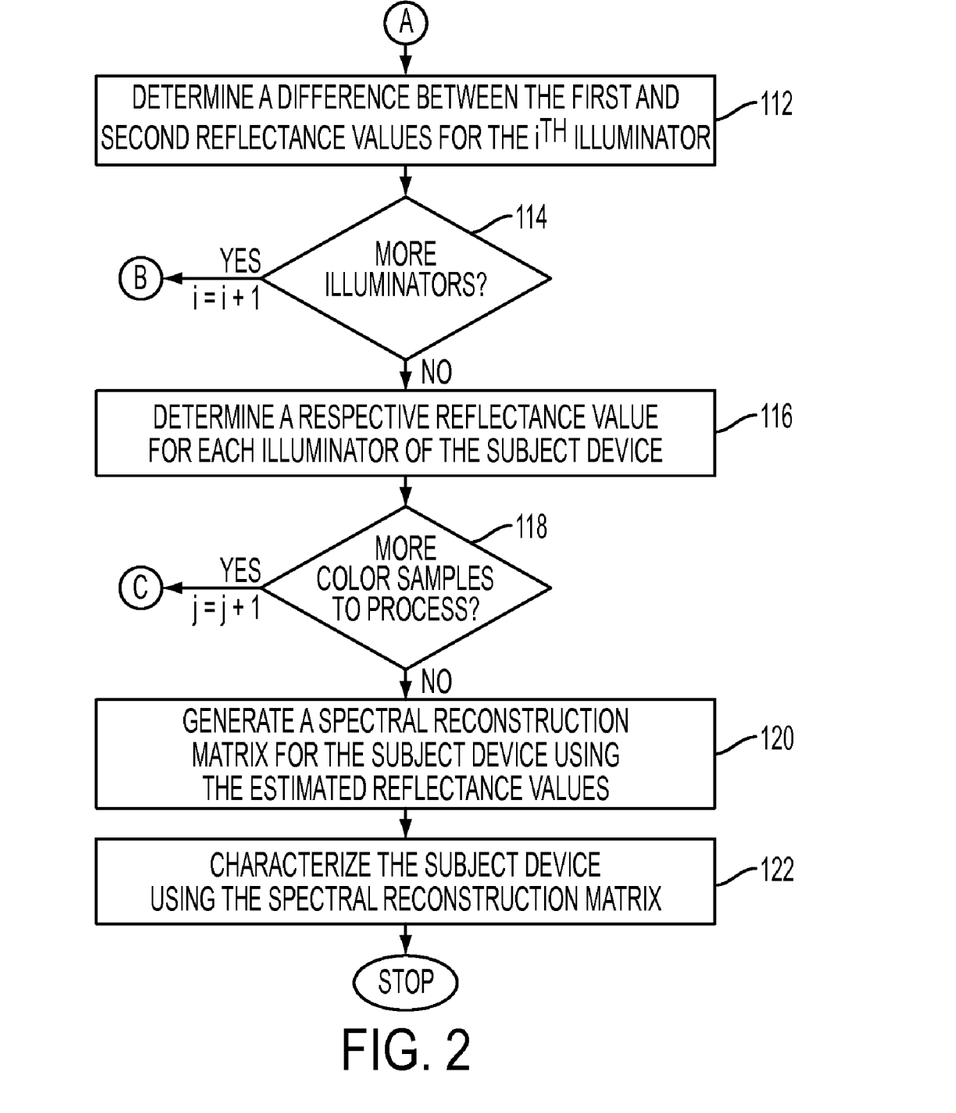
FIG. 2 which is a continuation of the flow diagram of FIG. 1 with flow processing continuing with respect to node A.

Reference is now being made to the flow diagram of FIG. 2 which is a continuation of the flow diagram of FIG. 1 with flow processing continuing with respect to node A.

At step 112, a difference between the first and second reflectance values is determined for the current illuminator. As used herein, this difference comprises:

$$\Delta R_i(\lambda) = R1_i(\lambda_1) - R2_i(\lambda_2). \quad (2)$$

Thus, in the current iteration for the 1st illuminator, the first reflectance value $R1_1(\lambda_1)$=$R1_1(437)$=≈0.172. And, the second reflectance value $R2_1(\lambda_2)$=$R2_1(439)$=≈0.175. Plugging these values for the 1st illuminator into Eq. 2, the determined difference is:

$$\Delta R_1(\lambda) = R1_1(\lambda_1) - R2_1(\lambda_2).$$

$$\Delta R_1(\lambda) = R1_1(437) - R2_1(439).$$

$$\Delta R_1(\lambda) = 0.172 - 0.175.$$

$$\Delta R_1(\lambda) = -0.003.$$

At step 114, a determination is made whether any more illuminators of the subject reflectance sensing device remain to be processed for the current color training sample. If so, then processing proceeds with respect to node B which continues back to step 108 of FIG. 1 for a next illuminator where i=i+1. Thereafter, the reference curve for the current $j^{th}$ color training sample is again used to determine a first reflectance value corresponding to the wavelength value measured for the next $i^{th}$ illuminator of the subject device and to determine a second reflectance value corresponding to the wavelength value measured for the corresponding $i^{th}$ illuminator of the master device.

By way of continued example, when i=7, for the $7^{th}$ illuminator, the wavelength measure for the subject device is $\lambda_1$=622 nm (from FIG. 5). Again using the reference curve of FIG. 3, this particular wavelength value corresponds to a first reflectance value: $R1_7(\lambda_1)$=$R1_7(622)$=≈0.847. Similarly, for the $7^{th}$ illuminator of the master device, the wavelength is $\lambda_2$=624 nm. Using the reference curve of FIG. 3, this wavelength corresponds to a second reflectance value $R2_7(\lambda_2)$=$R2_7(624)$=≈0.851. Thus, for the $7^{th}$ illuminator for the current $j^{th}$ color training sample, the determined difference is $\Delta R_7(\lambda)$=$R1_7(\lambda_1)$−$R2_7(\lambda_2)$=0.847−0.851=−0.004. In a similar manner, a difference value is determined for each illuminator on each iteration. The difference is associated with each illuminator and stored. The corresponding first and second reflectance values may also be stored for subsequent retrieval. Processing repeats until a difference has been calculated between the first and second reflectance values for each illuminator of the subject device.

At step 116, a respective estimated reflectance value is determined for each illuminator of the subject device. In one embodiment, for a given color training sample, the estimated reflectance value $V_{Est(i)}$ for the $i^{th}$ illuminator of the subject device, is given as:

$$V_{Est(i)} = V_{Mstr(i)} + \Delta R_i(\lambda),$$

where $V_{Mstr(i)}$ is the pre-measured reflectance value of the corresponding $i^{th}$ illuminator of the master reflectance sensing device for the current color training sample, and $\Delta R_i(\lambda)$ is the difference determined for the $i^{th}$ illuminator for the current color training sample as discussed above.

At step 118, a determination is made whether any more color training samples remain to be processed. If so, then processing repeats with respect to step 106 of FIG. 1 for j=j+1. A reference spectral reflectance curve is retrieved for a next $j^{th}$ sample. The reference curve for this next color training sample is retrieved. Then, for each $i^{th}$ illuminator, the retrieved curve for the $j^{th}$ sample is used to determine a first reflectance value $R1_i(\lambda_1)$ corresponding to the wavelength measured for the $i^{th}$ illuminator of the subject device and to determine a second reflectance value $R2_i(\lambda_2)$ corresponding to the wavelength measured for the $i^{th}$ illuminator of the master device. A difference is determined between the first and second reflectance values, in a manner as discussed above, for the current $i^{th}$ illuminator. Processing repeats for the current $j^{th}$ sample until a difference has been calculated between the first and second reflectance values for each illuminator of the subject device.

Processing repeats until estimated reflectance values have been determined for each color training sample for each illuminator of the subject reference reflectance. These values are stored for further processing.

At step 120, a spectral reconstruction matrix is generated using the estimated reflectance values determined for each color training sample. The spectral reconstruction matrix can be generated using a variety of techniques such as, for example, those disclosed in the above-referenced paper: "*Image-Based Spectral Reflectance Reconstruction Using The Matrix R Method*". Methods for generating a spectral reconstruction matrix are well established. As such, a discussion regarding a particular method for generating the spectral reconstruction matrix for a subject spectral reflectance sensing device has been omitted. One algorithm is a dynamic, Karhunen-Loeve-based (DKL) spectral reconstruction algorithm. One characteristic of the DKL algorithm is that, in the determination of spectra, greater importance is given to the data from the color training samples in the neighborhood of the sample under measurement. This is done using linear operators and basis vectors. Another is the dynamic, Least Squares-based (DLS) spectral reconstruction algorithm. By using a reconstruction algorithm, based on the spectral characteristics of the illumination source and the color sensing system, the integrated multiple illuminant measurements from a non-fully illuminant populated color sensor are converted into a fully populated spectral curve.

At step 122, the subject reflectance sensing device is characterized using the special reconstruction matrix. Thereafter, processing stops.

In various embodiments, characterization for each of the spectrophotometers LED spectral energy outputs may be done by using a standard white (or other) tile test target of known reflectivity for the spectrophotometer to convert each LED measurement to absolute reflectance values. Spectrophotometer characterization data may be stored in an integral PROM Integrated Circuit (IC) chip provided with the spectrophotometer, if desired. Alternatively, initial characterization data may be programmed into the software being used to analyze the output of the spectrophotometer in other known manners, such as loading it into the disc storage or other programmable memory. A performance evaluation test is generally performed on each subject device after its reconstruction matrix has been generated and installed. Such an evaluation typically involves mounting the sensor in a fixture, for example, in the paper path of a print device, and then using the sensor(s) to measure a set of evaluation color samples (e.g., 495) which are different than the characterization color training samples. The evaluation color samples are measured multiple times. The results are then analyzed to determine sensor repeatability as well as accuracy with respect to a set of reference measurements taken for the same evaluation color samples. Once repeatability and accuracy have met quality control specifications, the spectrophotometric device can be released from manufacturing and made then available for shipment.

Advantageously, the present method, as described above with respect to the flow diagrams of FIGS. 1 and 2 can be repeated in response to a predetermined amount of time having passed or if the subject reflectance sensing device requires a re-characterization. In this instance, new estimated reflectance values would be determined for each of a plurality of color training samples for each illuminator for the subject reflectance sensing device. The new estimated reflectance values would then be used to generate a new reconstruction matrix and the subject device would be recharacterized using the new reconstruction matrix.

Performance Results

Utilizing a pair of LED spectrophotometers from the same manufacturing batch, a baseline color characterization was performed on each sensor using the full manufacturing process. A characterization training set of 3135 xerographic color patches produced by an iGen3 color printer were used. The color accuracy and repeatability of both sensors were evaluated using standard tests. An adapted spectral reconstruction matrix was created for the subject sensor using the estimated color reference values. A simple linear interpolation was used to obtain $\Delta R(\lambda)$ values for cases where peak wavelengths of master or subject LED illuminators fell between actual reference spectrophotometer reflectance values. Color accuracy was determined to be less than 1.1 deltaE 2000 with respect to reference instrument (X-Rite Rite 938 Spectrophotometer), $95^{th}$ percentile for 495 evaluation color patches, produced Xerographically on qualified media. In terms of repeatability, results showed less than 0.5 deltaE 2000 peak-to-peak for 10 replicates, $95^{th}$ percentile for 495 evaluation color patches, produced Xerographically on qualified media.

Example Characterization System

Figure 6:
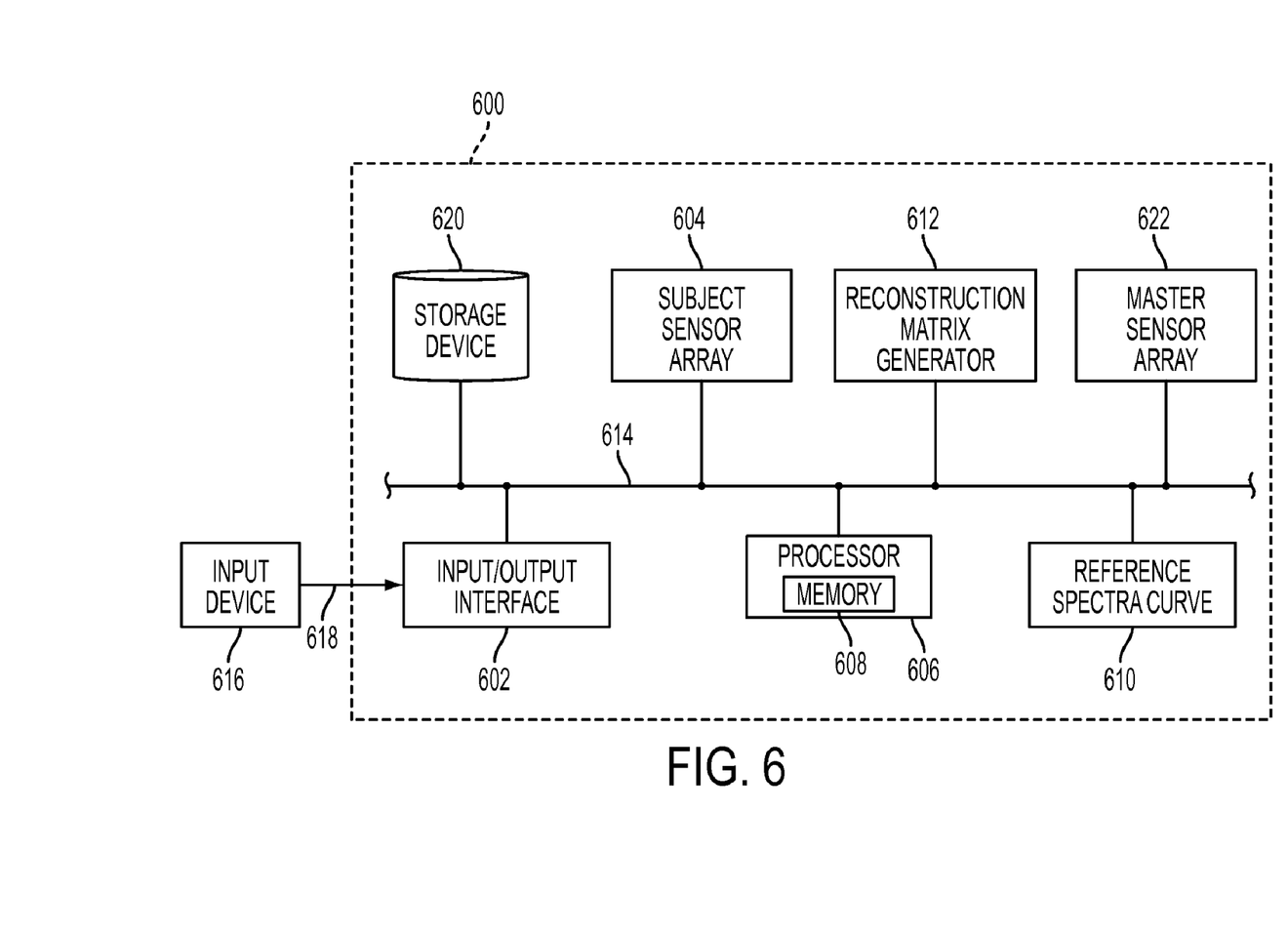
FIG. 6 is a functional block diagram of an example characterization system wherein various aspects of the methods hereof described with respect to the flow diagrams of FIGS. 1 and 2 are performed.

Reference is now being made to FIG. 6 which illustrates a functional block diagram of one example embodiment of a spectral reflectance sensing characterization system utilizing various aspects of the present method as discussed with respect to the flow diagrams of FIGS. 1 and 2.

Characterization system 600 includes an input/output interface 602, a subject reflectance sensing device 604, a master reflectance sensing device 622, a processor 606, a memory 608, a reference spectral curve 610, a reconstruction matrix generator 612, and storage device 620, all interconnected by communication bus 614. The characterization system is shown connected to an input device 616 via link 618 which inputs various information needed to implement the operations of the system and may include a mouse, a keyboard, a touch-screen device, a voice recognition-based input device, and/or any other device suitable for inputting information. Communication link 618 can be a wired, wireless or optical link to a network (not shown). Input/output interface 602 is a module which manages the flow of data from input device 616 to bus 614. Reflectance sensing device 604 is intended to be characterized and is substantially similar to the configuration of master reflectance sensing device 622. Processor 606 receives a reference curve 610 associated with each of a given number of color training samples. The processor obtains wavelength measurements for each illuminator of master device 622 and subject device 604. Such wavelength values may be retrieved from memory 608 or from a remote device, such as a computer workstation, using communication bus 614 over a wired or wireless network connection (not shown). Any of the modules may be placed in communication with memory 608 and may store computational values and interim data therein. Any of the modules or communication links may be connected to a local area network, a wide area network, an intranet, the Internet, or any other distributed processing and storage network via a communications pathway (not shown).

In accordance with the embodiment discussed with respect to the flow diagrams of FIGS. 1 and 2, processor 606 uses reference curve 610 retrieved for the $j^{th}$ color sample to determine a first reflectance value corresponding to the wavelength measured for the $i^{th}$ illuminator of the subject device 604 and a second reflectance value corresponding to the wavelength measured for the ith illuminator of the master device 622. The first and second reference values for each illuminator of the subject device may be stored in memory 608. Processor 606 calculates a difference between the first and second reflectance values for the ith illuminator. The determined difference is associated with the ith illuminator of the subject device and stored in memory or in storage device 620. An estimated reflectance value is calculated for each illuminator of the subject device 604. The estimated reflectance values for each illuminator are provided to reconstruction matrix generator 612. The spectral reconstruction matrix generated by matrix generator 612 is used to characterize subject device 604.

It should be appreciated that a "module" or "unit", as shown and described with respect to the embodiments hereof designates a system component comprised of software or hardware, or a combination of both which is designed to perform a given function. A plurality of modules may collectively perform a given function. A module may be implemented using a single software program comprising, at least in part, machine readable program instruction, or a single piece of hardware such as an ASIC, electronic circuit, or special purpose processing system. A plurality of modules may be executed by either a single computer system or a plurality of computer systems operating in parallel. Connections between modules (or "units") include both physical and logical connections. A system includes one or more software and/or hardware modules which may further comprise an operating system, drivers, device controllers, and other apparatuses some or all of which may be connected via a network.

The characterization system 600 of FIG. 6 is preferably implemented either on a single program general purpose computer or separate programmed general purpose computer. One or more of the modules of the system 600 can be implemented on a special purpose computer, a programmed microprocessor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowcharts hereof or appropriate portions thereof. The particular form each of the modules will take is a design choice and will be obvious and predictable to those skilled in the art. Furthermore, the disclosed characterization system and method may be implemented, in part, in software using object or object-oriented software development environments that provide portable source code that can be used on a variety of computer or workstation hardware platforms. Alternatively, the disclosed characterization system and method may be implemented partially or fully in hardware using logic circuits in conjunction with a spectrophotometric device. Moreover, various aspects of the disclosed system and method may be implemented as software executed on a programmed general purpose computer, a special purpose computer, a micro-processor, or the like. The systems and methods described above can be readily implemented in hardware or software using any known or later developed systems or structures, devices and/or software by those skilled in the applicable art without undue experimentation from the functional description provided herein together with a general knowledge of the computer arts.

Example Special Purpose Computer

Figure 7:
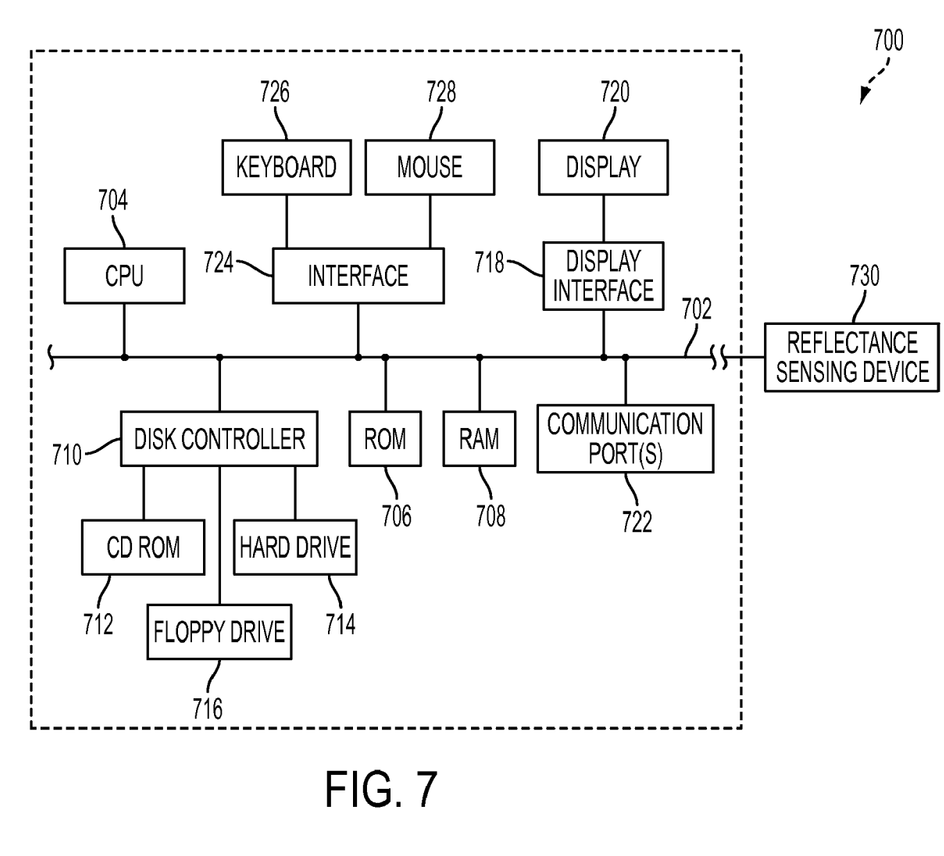
FIG. 7 is a functional block diagram of a special purpose computer system for performing various aspects of the present method.

Reference is now being made to FIG. 7 which illustrates a block diagram of one example embodiment of a special purpose computer system for implementing one or more aspects of the present method as described with respect to the flow diagrams of FIGS. 1 and 2 and the characterization system of FIG. 6. Such a special purpose processor 700 is capable of executing machine executable program instructions.

In FIG. 7, communications bus 702 serves as an information highway interconnecting the other illustrated components of special purpose computer system 600 which is in communication with reflectance sensing device 730 which may be one or both of the above-described subject reflectance sensing device or the master reflectance sensing device. The special purpose computer incorporates a central processing unit (CPU) 704 capable of executing machine readable program instructions for performing any of the calculations, comparisons, logical operations, and other program instructions for performing any of the steps described above with respect to the flow diagrams and illustrated embodiments hereof. Processor 704 is in communication with memory (ROM) 706 and memory (RAM) 708 which, collectively, constitute example storage devices. Such memory may be used to store machine readable program instructions and other program data and results to sufficient to carry out any of the functionality described herein with respect to the flow diagrams of FIGS. 1 and 2 and the system of FIG. 6. Disk controller 710 interfaces with one or more storage devices 714. These storage devices may comprise external memory, zip drives, flash memory, USB drives, or other devices such as CD-ROM drive 712 and floppy drive 716. The storage device may store machine executable program instructions for executing the methods hereof or for performing any of the functionality shown with respect to the system of FIG. 6. Such storage devices may be used to implement a database wherein various records are stored. Display interface 718 effectuates the display of information on display 720 in various formats such as, for instance, audio, graphic, text, and the like. Interface 724 effectuates a communication via keyboard 726 and mouse 728, collectively a graphical user interface. Such a graphical user interface is useful for a user to enter information about any of the displayed information in accordance with various embodiments hereof. Communication with external devices may occur using example communication port(s) 722. Such ports may be placed in communication with any of the example networks shown and described herein, such as the Internet or an intranet, either by direct (wired) link or wireless link, as shown and discussed with respect to the system of FIG. 6. Example communication ports include modems, network cards such as an Ethernet card, routers, a PCMCIA slot and card, USB ports, and the like, capable of transferring data from one device to another.

Software and data is transferred via the communication ports in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

The computations necessary to establish and/or to determine adjustment of individual image formation parameters such as, for example, selection from among the individual available thresholds and/or dilation parameters, may be implemented within a circuit in the image forming device itself. Alternatively, such computations may be performed on a programmable general purpose computer, special purpose computer, program microprocessor or microcontroller, or other like digital signal processing devices. These other like digital signal processor may include, but are not limited to, peripheral integrated circuit elements, ASIC, or other integrated circuits, hard-wired electronic or logic circuit, or the like, or may even be manipulated through manual adjustment of one or more operating parameters and/or user-adjustable input parameters that may be associated with one or more of the operating parameters of the system and methods disclosed. It should be appreciated that, given the required inputs, to include, but not be limited to, appropriate information regarding thresholds and/or inputs regarding device settings, and the like, and may include inputting software algorithms or any combination of software, hardware and/or firmware control parameters to implement the individual devices and/or modules hereof in varying combinations.

Computer readable media is understood to be a machine readable media capable of having embodied thereon various program instructions or other machine executable codes or commands that implement and facilitate the function, capability, and methods described herein. A computer readable medium may additionally comprise computer readable information in a transitory state such as a network link and/or a network interface, including a wired network or a wireless network, which allows the computer system to read such computer readable information. Computer programs (also called computer control logic) may be stored in memory. Computer programs may also be received via a communications interface or bus. A computer readable medium is also capable of storing data, machine instructions, message packets, or other machine readable information, and may include non-volatile memory. Such computer programs, when executed, enable the computer system to perform one or more aspects of the above-described methods.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A method for characterizing a subject reflectance sensing device without measuring a full set of characterization color patch training samples used in manufacturing and characterizing individual sensors of multi-illuminator spectrophotometric reflectance sensing systems, the method comprising:

measuring, for each illuminator of a fleet master reflectance sensing device, a respective wavelength;
   measuring, for each illuminator of the subject reflectance sensing device, a respective wavelength, said subject reflectance sensing device having a same number of corresponding illuminators as said fleet master reflectance sensing device; and
   for each of a subset of the full set of color training samples:
      receiving a reference spectral reflectance curve for each sample; and for each illuminator of said subject reflectance sensing device:
         using said reference spectral reflectance curve to obtain a first reflectance value corresponding to a wavelength measured for each illuminator of said subject reflectance sensing device, and to obtain a second reflectance value corresponding to a wavelength measured for a corresponding illuminator of said fleet master reflectance sensing device;
         calculating a difference in wavelength between said obtained first and second reflectance values at wavelength value $\lambda$; and
         storing said calculated difference for the current illuminator for this color training sample to a storage device.

2. The method of claim 1, wherein determining any of said first and second reflectance values using said reference spectral reflectance curve comprises an interpolation between points on said reference curve.

3. The method of claim 1, wherein any of said wavelengths measured for any of said subject reflectance sensing device and said fleet master reflectance sensing device comprises any of: a peak wavelength value, a median wavelength value, a mean wavelength value, and full width half max wavelength value.

4. The method of claim 1, further comprising determining an estimated reflectance value for each of a plurality of color training samples for each illuminator of said subject reflectance sensing device, wherein said estimated reflectance value $V_{Est(i)}$ for the illuminator comprises:

$$V_{Est(i)} = V_{Mstr(i)} + \Delta R_i(\lambda),$$

where $V_{Mstr(i)}$ is the reflectance value of the corresponding $i^{th}$ illuminator of the master reflectance sensing device, and $\Delta R_i(\lambda)$ is the difference determined for the illuminator at wavelength value $\lambda$.

5. The method of claim 3, further comprising:
generating a spectral reconstruction matrix for said subject reflectance sensing device using said estimated reflectance values determined for each of said plurality of color training samples; and
characterizing said subject reflectance sensing device using said spectral reconstruction matrix.

6. The method of claim 3, wherein, in response to a predetermined amount of time having passed, further comprising:
determining a new estimated reflectance value for each of a plurality of test samples for each illuminator for said subject reflectance sensing device;
using said new estimated reflectance values to generate a new spectral reconstruction matrix; and
recharacterizing said subject reflectance sensing device using said new spectral reconstruction matrix.

7. A system for characterizing a subject reflectance sensing device without measuring a full set of characterization color patch training samples used in manufacturing and characterizing individual sensors of multi-illuminator spectrophotometric reflectance sensing systems, said system comprising:
a memory and a storage device;
a fleet master reflectance sensing device having a wavelength measurement for each of a plurality of illuminators;
the subject reflectance sensing device having a wavelength measurement for each of a plurality of illuminators, said subject device having a same number of corresponding illuminators as said fleet master reflectance sensing device;
a processor in communication with said memory and storage device, said processor executing machine readable instructions for performing the method of:
for each of a subset of the full set of color training samples:
receiving a reference spectral reflectance curve for each sample; and
for each illuminator of said subject reflectance sensing device:
using said reference spectral reflectance curve to obtain a first reflectance value corresponding to a wavelength measured for each illuminator of said subject reflectance sensing device, and to obtain a second reflectance value corresponding to a wavelength measured for a corresponding illuminator of said fleet master reflectance sensing device;
calculating a difference in wavelength between said obtained first and second reflectance values at wavelength value $\lambda$; and
storing said calculated difference for the current illuminator for this color training sample to a storage device.

8. The system of claim 7, wherein determining any of said first and second reflectance values using said reference spectral reflectance curve comprises an interpolation between points on said reference curve.

9. The system of claim 7, wherein any of said wavelengths measured for any of said subject reflectance sensing device and said fleet master reflectance sensing device comprises any of: a peak wavelength value, a median wavelength value, a mean wavelength value, and full width half max wavelength value.

10. The system of claim 7, further comprising determining an estimated reflectance value for each of a plurality of color training samples for each illuminator of said subject reflectance sensing device, wherein said estimated reflectance value $V_{Est(i)}$ for the illuminator comprises:

$$V_{Est(i)} = V_{Mstr(i)} + \Delta R_i(\lambda),$$

where $V_{Mstr(i)}$ is the reflectance value of the corresponding illuminator of the master reflectance sensing device, and $\Delta R_i(\lambda)$ is the difference determined for the $i^{th}$ illuminator at wavelength value $\lambda$.

11. The system of claim 10, further comprising:
generating a spectral reconstruction matrix for said subject reflectance sensing device using said estimated reflectance values determined for each of said plurality of color training samples; and
characterizing said subject reflectance sensing device using said spectral reconstruction matrix.

12. The system of claim 10, wherein, in response to a predetermined amount of time having passed, further comprising:
determining a new estimated reflectance value for each of a plurality of test samples for each illuminator for said subject reflectance sensing device;
using said new estimated reflectance values to generate a new spectral reconstruction matrix; and
recharacterizing said subject reflectance sensing device using said new spectral reconstruction matrix.

13. A computer implemented method for characterizing a subject reflectance sensing device without measuring a full set of characterization color patch training samples used in manufacturing and characterizing individual sensors of multi-illuminator spectrophotometric reflectance sensing systems, the method comprising:
measuring, for each illuminator of a fleet master reflectance sensing device, a respective wavelength;
measuring, for each illuminator of the subject reflectance sensing device, a respective wavelength, said subject reflectance sensing device having a same number of corresponding illuminators as said fleet master reflectance sensing device;
for each of a subset of the full set of color training samples:
receiving a reference spectral reflectance curve for each sample; and for each illuminator of said subject reflectance sensing device:
using said reference spectral reflectance curve to obtain a first reflectance value corresponding to a wavelength measured for each illuminator of said subject reflectance sensing device, and to obtain a second reflectance value corresponding to a wavelength measured for a corresponding illuminator of said fleet master reflectance sensing device; and
calculating a difference in wavelength between said obtained first and second reflectance values at wavelength value $\lambda$; and
for each of a plurality of color training samples:
using said calculated difference for the current illuminator for this color training sample to determine an estimated reflectance value for this color training sample;

generating a spectral reconstruction matrix for said subject reflectance sensing device using said estimated reflectance values determined for each of said plurality of color training samples; and characterizing said subject reflectance sensing device using said spectral reconstruction matrix.

14. The computer implemented method of claim 13, wherein any of said wavelengths measured for any of said subject reflectance sensing device and said fleet master reflectance sensing device comprises any of: a peak wavelength value, a median wavelength value, a mean wavelength value, and full width half max wavelength value.

15. The computer implemented method of claim 13, wherein said estimated reflectance value $V_{Est(i)}$ for the illuminator of said subject device comprises:

$$V_{Est(i)} = V_{Mstr(i)} + \Delta R_i(\lambda),$$

where $V_{Mstr(i)}$ is the reflectance value of the corresponding illuminator of the master reflectance sensing device, and $\Delta R_i(\lambda)$ is the difference determined for the $i^{th}$ illuminator at wavelength value $\lambda$.

16. The computer implemented method of claim 15, wherein, in response to a predetermined amount of time having passed, further comprising:

determining a new estimated reflectance value for each of a plurality of test samples for each illuminator for said subject reflectance sensing device;

using said new estimated reflectance values to generate a new spectral reconstruction matrix; and recharacterizing said subject reflectance sensing device using said new spectral reconstruction matrix.

17. The computer implemented method of claim 13, further comprising storing said estimated reflectance values determined for each of said plurality of color training samples for each illuminator for said subject reflectance sensing device to a storage device.

* * * * *